United States Patent [19]

Rubin et al.

[11] Patent Number: 4,559,234

[45] Date of Patent: Dec. 17, 1985

[54] MEAT CURING COMPOSITIONS AND METHOD OF USE

[75] Inventors: Leon J. Rubin; Levente L. Diosady; Fereidoon Shahidi, all of Toronto; Darrell F. Wood, Nepean, all of Canada

[73] Assignee: Canadian Patents and Development Limited, Ottawa, Canada

[21] Appl. No.: 615,117

[22] Filed: May 30, 1984

[51] Int. Cl.$^4$ .................... A23B 4/14; A23L 1/31
[52] U.S. Cl. .................... 426/250; 426/265; 426/271; 426/332; 426/540; 426/641; 426/652
[58] Field of Search ............ 426/250, 265, 271, 332, 426/641, 652, 540, 542, 545, 546, 547, 646, 264, 266, 541

[56] References Cited

U.S. PATENT DOCUMENTS

| | | | |
|---|---|---|---|
| 2,147,261 | 2/1939 | Lewis | 426/265 |
| 2,553,533 | 5/1951 | Komarik et al. | 426/265 |
| 2,739,899 | 3/1956 | Hollenbeck | 426/265 |
| 2,831,774 | 4/1958 | Furgal et al. | 426/264 |
| 2,901,354 | 8/1959 | Douglass et al. | 426/332 X |
| 2,938,800 | 5/1960 | Sair | 426/540 |
| 3,366,495 | 1/1968 | Paul et al. | 426/332 X |
| 3,955,005 | 5/1976 | Trelease et al. | 426/332 X |
| 3,985,904 | 10/1976 | Bernotavicz | 426/332 |

FOREIGN PATENT DOCUMENTS

| | | | |
|---|---|---|---|
| 669938 | 9/1963 | Canada | 426/268 |
| 2528750 | 1/1977 | Fed. Rep. of Germany | 426/264 |
| 115486 | 10/1978 | Japan | 426/265 |

OTHER PUBLICATIONS

Chang et al., "Antioxidants in the Hemoglobin Catalyzed Oxidation of Unsaturated Fats", Food Technology, 10-1949, pp. 332-336.

Primary Examiner—Arthur L. Corbin
Attorney, Agent, or Firm—Alan A. Thomson

[57] ABSTRACT

Compositions for curing meats comprising dinitrosyl ferrohemochrome and at least one antioxidant, at least one sequestering agent and at least one antimicrobial agent. Such compositions bestow similar color, flavor, and microbiological stability as that associated with nitrite-treated meats.

16 Claims, No Drawings

MEAT CURING COMPOSITIONS AND METHOD OF USE

BACKGROUND TO THE INVENTION

This invention relates to the provision of alternatives to the use of nitrites in curing and flavouring meat.

Traditionally, "salting" was used for preservation of meat, and it is understood that the presence of nitrate impurities in the crude sodium chloride employed were responsible for meat curing. As time progressed, mixtures of salt, saltpeter (nitrate), sugar, etc., were used for the purpose of preserving, flavouring and colouring meat. Later it became known that nitrate, through the action of bacteria, was reduced to nitrite in curing processes. However, it was not until 1925 that regulations permitted the use of sodium nitrite as such in curing meat products.

Current meat curing practice involves the addition of nitrite, and sometimes nitrate, as well as salt, sugar, reductants, phosphates and possibly seasonings, to the meat. Sodium nitrite is undoubtedly a unique ingredient of the curing mixture due to its multiple function. It produces the characteristic cooked cured-meat colour and contributes to the typical flavour of cured-meat products. Nitrite with its potent antioxidant properties eliminates the problem of warmed-over flavours (WOF) and odours. Most importantly, it has a strong antimicrobial effect in retarding the formation of *Clostridium botulinum* toxin. Recently, nitrite has become the source of serious concerns. Nitrite may react with amines and amino acids present in meats, leading to the formation of carcinogenic nitrosamines, such as N-nitrosopyrrolidine and N-nitrosodimethylamine. The residual nitrite present in cured meat increases the total body burden of nitrite and may lead to the formation of nitrosamines in the stomach.

K. R. Bharucha et al, in U.S. Pat. No. 3,966,974, are concerned with replacing sodium nitrite with organic nitrites, and K. R. Bharucha and his co-workers, in U.S. Pat. Nos. 4,039,690, 4,076,849, 4,087,561 and 4,088,793, are concerned with various aspects of the control of nitrosamine production in nitrite-cured meats, particularly bacon.

As a result of the concern over the possible health hazards associated with nitrite, there has been considerable effort to either eliminate nitrite from cured meats, or to reduce its level of addition, in the hope of reducing the potential for nitrosamine formation. The invention described below presents an alternative to the use of nitrite in curing meats.

SUMMARY OF THE INVENTION

The present invention provides meat treating compositions comprising the preformed cooked cured-meat pigment, dinitrosyl ferrohemochrome, and at least one antioxidant agent, at least one sequestering agent and at least one antimicrobial agent. Suitable antioxidants include dl-α-tocopherol, butylated hydroxyanisole (BHA), butylated hydroxytoluene, propyl gallate, trihydroxybutyrophenone (THBP), nordihydroguaiaretic acid, t-butylhydroquinone (TBHQ), catechol, gum guaiac, lecithin, dilauryl thiodipropionate, ascorbic acid, physiologically acceptable salts of ascorbic acid, erythorbic acid, ascorbyl palmitate, and ascorbyl acetal. Suitable sequestering agents include monosodium phosphate, disodium phosphate, sodium hexametaphosphate, sodium tripolyphosphate, sodium pyrophosphate, citric acid, monoglyceride citrate, 8-hydroxyquinoline, sodium gluconate, catechol, ethylenediamine tetraacetic acid, disodium ethylenediamine tetraacetate, diethylenetriamine pentaacetic acid, salicylic acid. Suitable antimicrobial agents include sodium hypophosphite, potassium sorbate and propyl parahydroxybenzoate (propyl paraben ®), methyl fumarate, dimethyl fumarate, ethyl fumarate and diethyl fumarate. Of particular interest are compositions comprising dinitrosyl ferrohemochrome; antioxidant agents selected from the group consisting of sodium ascorbate, ascorbyl acetal, ascorbyl palmitate, TBHQ, BHA and THBP; and sequestering agents selected from the group consisting of sodium tripolyphosphate, sodium hexametaphosphate, ethylenediamine tetraacetic acid, diethylenetriamine pentaacetic acid. Such compositions may comprise (a) dinitrosyl ferrohemochrome; (b) an antioxidant; (c) a sequestering agent; and (d) an antimicrobial agent; wherein the weight to weight ratios are: (b)/(a) below 64 (preferably 2 to 16); (c)/(a) below 160 (preferably about 40) for a non-phosphate sequestering agent and below 1000 (preferably about 240) for a phosphate sequestering agent; and (d)/(a) below 1000 (preferably about 240). Such compositions may be in the form of a premix or kit of components in proportions appropriate for particular applications. The above-mentioned compositions may be mixed with water, with salt and sugar, and with water, salt and sugar.

A suitable process of application of such compositions to meat comprises dissolving the water-soluble ingredients in water, applying the water-insoluble ingredients to meat, and combining the modified meat and the water-based solution. The proportion of components employed in such a process measured per unit wet weight of meat and meat additives may be ~2% salt; ~1.5% sugar; in the range of 6 to 24 ppm (preferaby ~12 ppm) of dinitrosyl ferrohemochrome; below 400 ppm (preferably below 200 ppm) of antioxidant; below 1000 ppm (preferably ~500 ppm) of a non-phosphate sequestering agent; and below 6000 ppm (preferably ~3000 ppm) of a phosphate containing sequestering agent; below 6000 ppm (preferably ~3000 ppm) of an antimicrobial agent. An essentially nitrite-free meat product, indistinguishable in colour and flavour from nitrite-cured meat, may thus be produced.

DETAILED DESCRIPTION OF THE INVENTION

Reagents

All the chemicals used in these studies were reagent or foodgrade materials, unless otherwise specified, and were used without any further purification. The cooked cured-meat pigment, dinitrosyl ferrohemochrome, was prepared from hemin and sodium nitrite or nitric oxide in buffered solutions as reported by F. Shahidi et al, Can. Inst. Food Sci. Technol. J., 17, 33–37, 1984. Ascorbyl acetal was obtained from Canada Packers.

Preparation of Meat Systems

The meat, pork loin, was deboned and trimmed to remove most of the surface fat and was then ground twice using an Oster meat grinder, Model 990-68 [trademark]. Curing agents containing different ingredients were dissolved in 20% (by weight based on the weight of meat and curing agents) distilled water, and were then added to the ground meat. In the case of water-insoluble ingredients, the reagents were added directly to the meat and then diluted with the 20% distilled water. In all cases the mixture was mixed thoroughly to obtain homogenized samples.

The addition levels of different additives were: salt, 2%; sucrose, 1.5%; antioxidants, 200 ppm; chelators except phosphates, 500 ppm; and phosphates and polyphosphates, 3000 ppm. The addition level of other ingredients are individually specified where they appear in the tables. The pigment was added at a level of 12 ppm, unless otherwise stated. All levels specified were based on wet weight of meat and meat additives.

The homogenized meat systems were cooked in a thermostated water bath (85±2° C.) for a period of 40 min to an internal temperature of 75° C., while stirring continuously with a glass rod. After cooling to room temperature, the cooked meat systems were homogenized in a Waring blender and stored in plastic bags in a refrigerator at 4° C.

The thiobarbituric acid (TBA) values of the samples were determined after selected periods of storage ranging from 1 to 35 days. The distillations were carried out in duplicate, unless otherwise specified.

Determination of the TBA Numbers

The distillation method of B. G. Tarladgis et al, J. Food Sci. Agric. 15, 602, 1964, was adapted in this work. In all cases, unless otherwise specified, a 10 g meat sample was added into a 500 mL round-bottom flask containing 97.5 mL distilled water and 2.5 mL 4N HCl along with a few drops of Dow antifoam A and several glass beads. The mixture was then heated for a period of ~20 min to collect 50 mL of distillate.

The distillate was then shaken thoroughly and 5 mL of it was pipetted into a 50 mL vial containing 5 mL 0.02M aqueous solution of 2-thiobarbituric acid. The vial was then capped and heated in boiling water for a period of ~35 min to obtain a pink-coloured TBA-malonaldehyde complex. After cooling the vial to room temperature, the absorbance of the complex at 532 nm was measured using a Beckman DU-7 spectrophotometer. Multiplying the absorbance readings by a factor of 8.1 (see the results section) gives the TBA numbers. This value was obtained using different quantities of 1,1,3,3-tetramethoxypropane as standard.

Chemical Analyses of Meat

Fat analysis—Fat content of cooked meat samples was determined by the Soxhlet extraction method (AOAC, 1980).

Moisture content—The moisture content of the meat samples after cooking was found by oven drying of the meat for a period of 24 h at 100° C.

Protein analysis—The protein content of the meats was determined using the Kjeldahl method (AOAC, 1980).

Ash content—The ash content of the samples was determined by heating them in a furnace for a period of about 3 h at 700° C.

EXAMPLE 1

Effect of Sodium Nitrite

Table 1 presents the variation of the TBA number with time for cooked meat, uncured and cured with various levels of sodium nitrite.

TABLE 1

TBA Numbers of Nitrite Cured Meat Samples[a]

| | | Days of Storage at 4° C. | | | | | |
|---|---|---|---|---|---|---|---|
| No. | Meat System | 1 | 7 | 14 | 21 | 28 | 35 |
| 1 | No Additive | 4.95 | 8.96 | 10.50 | 11.67 | 12.12 | 13.73 |
| 2 | Sodium Nitrite (25 ppm) | 1.11 | 2.98 | 2.86 | 3.40 | 4.96 | 7.24 |
| 3 | Sodium Nitrite (50 ppm) | 0.22 | 2.76 | 2.65 | 3.17 | 4.05 | 4.07 |
| 4 | Sodium Nitrite (150 ppm) | 0.00 | 0.05 | 0.10 | 0.09 | 0.16 | 0.18 |

[a]Moisture 72.4%, and fat 10.5%

The TBA results for uncured meats increased with time to high values, parallel to the development of warmed-over flavour (WOF). The corresponding TBA numbers are much smaller ($\frac{1}{4}$ and $\frac{1}{3}$) with the addition of nitrite at low levels (25 and 50 ppm). However, at 150 ppm, sodium nitrite gives extremely good protection to meat against development of fat oxidation as indicated by small TBA numbers (<0.20) over a five-week storage period.

EXAMPLE 2

Effect of Ingredients Commonly Employed in Pickling Meats

The TBA numbers of cooked meat with salt, sugar, ascorbic acid and its related compounds, and sodium nitrite are given in Table 2 along with TBA values for untreated meat. Results indicate a slight pro-oxidant activity for sodium chloride. Presence of metal ion impurities as well as direct oxidative action of NaCl based on the reactivity of the chloride ion may account for this weak pro-oxidant effect, and such small effects probably have no practical significance.

The effect of sucrose on the TBA numbers is small, but no specific trend is discernible. This is consistent with the neutral nature of this additive.

On the other hand, ascorbic and erythorbic acids as well as sodium ascorbate show significant antioxidant effects and reduce the TBA numbers to less than half of the untreated meats after 3 to 4 weeks of storage. The antioxidative effects of ascorbic acid and related compounds may in part be due to their capacity to bind metal ions. Under

TABLE 2

TBA Numbers of Nitrite Cured Meat Samples[a]

| | | Days of Storage at 4° C. | | | | | |
|---|---|---|---|---|---|---|---|
| No. | Meat System[b] | 1 | 7 | 14 | 21 | 28 | 35 |
| 1 | No Additive | 4.39 | 11.41 | 11.00 | 13.28 | 13.76 | 15.46 |
| 2 | Salt | 7.04 | 11.36 | 11.06 | 12.40 | 14.60 | 15.75 |
| 3 | Sugar | 5.61 | 10.36 | 11.05 | — | 12.83 | — |
| 4 | Ascorbic Acid | 1.63 | 5.45 | 5.39 | 5.81 | — | — |

TABLE 2-continued

TBA Numbers of Nitrite Cured Meat Samples[a]

| No. | Meat System[b] | Days of Storage at 4° C. | | | | | |
|---|---|---|---|---|---|---|---|
| | | 1 | 7 | 14 | 21 | 28 | 35 |
| 5 | Isoascorbic (Erythorbic) Acid | 1.53 | 5.89 | 5.67 | 5.65 | 7.80 | — |
| 6 | Sodium Ascorbate | 1.98 | 5.73 | 7.32 | 7.40 | 7.12 | — |
| 7 | Ascorbyl Palmitate | 0.34 | 0.85 | 0.48 | 0.63 | 0.72 | 1.06 |
| 8 | Ascorbyl Acetal | 0.47 | 0.90 | 0.68 | 0.55 | 0.63 | 1.27 |
| 9 | Sodium Nitrite | 0.00 | 0.05 | 0.10 | 0.10 | 0.15 | 0.17 |

[a]Moisture 70.05%; fat 10.67%; protein 18.69%; and ash 0.81%
[b]The addition levels were for salt 2%; sugar 1.5%; ascorbic and erythorbic acids 500 ppm; sodium ascorbate 550 ppm; ascorbyl palmitate and acetal 1000 ppm; and for sodium nitrite 150 ppm.

certain conditions, however, ascorbic acid may act as a strong pro-oxidant.

Ascorbyl palmitate and $C_{16}$-acetal of ascorbic acid which are fat soluble and have been known to act as antinitrosamine agents for bacon (Bharucha et al, J. Agric. Food. Chem. 28, 1274, 1980) show strong and comparable antioxidative effects. However, the TBA values of meats treated with these additives were higher than nitrite-cured samples after 4 to 5 weeks of storage. It should be noted that the TBA values quoted here are low due to the error introduced by the presence of residual nitrites (see expt. 9 of Table 2).

EXAMPLE 3

Effect of Antioxidants

The TBA numbers for meat systems cured with commercial antioxidants are assembled in Table 3. The antioxidants tested were legally acceptable for inclusion in food, with the exception of catechol. The antioxidants were selected strictly on the basis of their antioxidant effect for this work.

ered as antioxidants; however, at the concentrations necessary to give adequate protection to foods, they usually contribute offensive flavours of their own to the meat samples. A combination of α-tocopherol and sodium ascorbate has been reported to be an effective antioxidant, although our preliminary results did not confirm such effectiveness. It has been found that addition of the α-tocopherol to bacon at a level of 500 ppm effectively reduced nitrosamine formation.

With the exception of BHT, all other antioxidants used in this work (Table 3) are extremely potent in the meat systems and all result in TBA values of less than 1 after 4 or 5 weeks of storage.

The antioxidative effect of BHA reaches its maximum at the 200 ppm level. The phenolic odour of this reagent imparts no undesirable flavours to meat at this addition level. The use of 30 ppm BHA in unsmoked dry sausages has been approved by the Meat Inspection Branch of the U.S. Department of Agriculture in 1955.

The effect of BHT is less pronounced than other antioxidants such as BHA, PG, NDGA, TBHQ and

TABLE 3

Effect of Commercial Antioxidants on the TBA Numbers[a]

| No. | Meat System[b] | Days of Storage at 4° C. | | | | | |
|---|---|---|---|---|---|---|---|
| | | 1 | 7 | 14 | 21 | 28 | 35 |
| 1 | No additive | 4.39 | 11.49 | 11.00 | 13.28 | 13.26 | 15.46 |
| 2 | dl-α-tocopherol | 1.95 | 7.52 | 6.37 | 6.77 | 7.21 | 8.36 |
| 3 | Butylated hydroxyanisole (BHA) | 0.23 | 0.50 | 0.53 | 0.48 | — | 0.47 |
| 4 | Butylated hydroxytoluene (BHT) | 1.33 | 1.92 | 2.33 | 1.99 | 2.04 | 1.89 |
| 5 | Propyl gallate (PG) | 0.19 | 0.27 | 0.30 | 0.30 | 0.27 | 0.38 |
| 6 | Trihydroxybutyrophenone (THBP) | 0.39 | 0.43 | 0.30 | 0.40 | 0.43 | 0.45 |
| 7 | Nordihydroguaiarectic acid (NDGA) | 0.58 | 0.71 | 0.49 | 0.65 | 0.76 | — |
| 8 | t-butylhydroquinone (TBHQ) | 0.39 | 0.44 | 0.38 | 0.40 | 0.45 | 0.45 |
| 9 | Catechol | 0.09 | 0.46 | 0.46 | 0.48 | 0.66 | 0.85 |
| 10 | Gum guaiac (1000 ppm) | 0.21 | 0.73 | 0.77 | 0.98 | 0.94 | — |
| 11 | Gum guaiac (3000 ppm) | 0.16 | 0.40 | 0.43 | 0.51 | 0.46 | 0.59 |
| 12 | Lecithin (3000 ppm) | 4.56 | 11.81 | 11.71 | 12.84 | 12.97 | 13.12 |
| 13 | Dilauryl thiodipropionate (DLTP) (200 ppm) | 4.68 | 11.59 | 11.82 | 13.14 | 13.37 | 14.71 |
| 14 | DLTP (400 ppm) | 4.51 | 10.20 | 9.62 | 10.60 | 12.37 | 11.93 |

[a]Antioxidant addition level of 200 ppm was selected unless otherwise specified
[b]Moisture 70.05%; fat 10.67%; protein 18.69%; and ash 0.81%

The TBA numbers for lecithin and dilauryl thiodipropionate (DLTP) indicate only slight antioxidant role for these additives when used alone (see Table 3). Kochendorfer and Smith, Proc. Iowa Acad. Sci. 39, 169, 1932, found that while commercial lecithins act as weak antioxidants, they were even less effective in their purified forms and it has been reported that lecithin is inactive in lard. The antioxidant effect of DLTP was reported to be slight when used alone; however, in combination with BHA strong antioxidant effects were observed.

The effect of α-tocopherol on the oxidative stability of the meat system was limited to the first day or so, and a sharp increase in the TBA values was observed after one week of storage. Tocopherols are generally consid- THBP. This may be due to the fact that BHT does not possess such good carry-through properties as the others.

Nordihydroguaiaretic acid (NDGA), which is most effective in preventing the oxidation of phospholipids, was approved by the Meat Inspection Branch of the U.S. Dept. of Agriculture in 1943, and was later patented (W. M. Lauer, U.S. Pat. No. 2,373,192) for use in lard and rendered pork fat. Our results indicate a slight darkening of the meat systems treated with this reagent. Although no organoleptic tests were carried out, it is known that the reagent has a slightly bitter taste. Catechol, which may be considered as the parent compound for NDGA, is a slightly better antioxidant than its derivative NDGA. Dipping bacon pieces in fat solutions of NDGA and BHA has been found to increase the stability of the product and the use of aqueous solutions or suspensions of NDGA, PG or BHA with or without synergists, were patented by S. L. Komarick and L. H. Hall, U.S. Pat. No. 2,553,533, for soaking pork bellies prior to curing.

Propyl gallate (PG), like NDGA, does not possess extensive carry-through properties for use in fried foods, and like NDGA may impart a colour to meat products due to its reaction with traces of iron in the system. It has been found that PG or BHA combined with ascorbic acid effectively inhibited lipid oxidation in raw ground beef during 8 days of refrigerated storage.

The antioxidant properties of trihydroxybutyrophenone (THBP) and t-butyl-hydroquinone (TBHQ) are similar in our system (Table 3). TBHQ has been considered to be one of the best food-approved antioxidants.

Gum guaiac, which is a resinous exudate of a tropical tree, contains guaiaretic, α- and β-guaiaconic acids and has a very powerful antioxidative effect, especially at an addition level of 3000 ppm. The use of gum guaiac as an antioxidant for fats and oil was patented some fifty years ago by R. C. Newton and W. D. Grettie, U.S. Pat. No. 1,903,126, and it was the first antioxidant to be approved for use in lard by the Meat Inspection Branch of the U.S. Dept. of Agriculture in 1940. It has also been patented for use in a variety of food products. Gum guaiac is reported to add odour and flavour to foods and, in some cases, these have been described as "not unpleasant smokey flavours" and they can be removed from fats by deodorization.

EXAMPLE 4

Effect of Sequestrants (chelators)

Table 4 summarizes the TBA numbers of meat samples treated with different sequestrants or chelating agents. Although all phosphorus-containing chelators showed antioxidant effects, only sodium pyrophosphate (SHMP) had minor antioxidant effects when used alone. Pyro-, tripoly- and hexametaphosphates have been shown to protect cooked meats from autoxidation. In addition, phosphates may influence the colour and flavour of meat and their antioxidative role is due to their ability to sequester heavy metals, particularly ferrous ions which are the major prooxidants in meat systems. Polyphosphates are a normal component of meat-curing systems since they improve the cooking yield of meats by increasing their water-holding capacity due to the unfolding of meat tissues at the high pH of their solutions.

Citric acid and monoglyceride citrate have only small effects on the control of oxidative rancidity, as the TBA numbers indicate, although monoglyceride citrate was slightly more effective. Citric acid has been reported as being ineffective in lard, although it acts as a powerful synergist with antioxidants.

Sodium gluconate and salycilic acid (SA) were also found to have minimal effects in retarding fat oxidation (Table 4).

The antioxidant effects of 8-hydroxyquinoline and catechol was extensive and TBA numbers of less than 2 and 1 were obtained respectively over a 5-week storage period for meats treated with these reagents. The stronger effect of catechol in retarding fat oxidation arises from its phenolic nature; it exhibits antioxidant effects as do other phenolic antioxidants, in addition to its chelating ability. Unfortunately, neither of these compounds is an approved food additive.

On the other hand, the food-grade chelator, the disodium salt of ethylenediamine tetraacetic acid ($Na_2$ EDTA), was found to be highly effective. The TBA numbers of meats did not exceed unity over a 5-week storage period for meats treated with this reagent. This is in accord with the strong chelating ability of EDTA for metal ions. Diethylenetriamine pentaacetic acid (DTPA), with more binding sites for chelation, was even more effective in retarding fat oxidation, and TBA values reached only 0.36 after five weeks of storage.

While salycilic acid (SA) alone had no effect in re-

TABLE 4

| | TBA Number of Meat Systems Treated with Sequestrants[a] | | | | | |
|---|---|---|---|---|---|---|
| | | \multicolumn{6}{c}{Days of Storage at 4° C.} | | | | | |
| No. | Meat System[b] | 1 | 7 | 14 | 21 | 28 | 35 |
| 1 | No additive | 4.95 | 8.96 | 10.50 | 11.67 | 12.12 | 13.73 |
| 2 | Monosodium phosphate | 5.60 | 10.56 | 10.53 | 10.06 | 10.66 | 11.01 |
| 3 | Disodium phosphate | 4.56 | 9.19 | 9.58 | 9.89 | 10.49 | 9.20 |
| 4 | Sodium hexametaphosphate | 5.19 | 8.19 | 8.94 | 8.71 | 8.74 | 10.09 |
| 5 | Sodium tripolyphosphate (1500 ppm) | 4.09 | 8.75 | 8.40 | 9.78 | 9.66 | 10.48 |
| 6 | Sodium tripolyphosphate (STPP) | 0.21 | 0.65 | 1.69 | 1.22 | 2.90 | 4.79 |
| 7 | Sodium Pyrophosphate | 0.71 | 0.50 | 0.36 | 0.72 | 0.86 | 0.73 |
| 8 | Citric acid (CA) | 2.74 | 8.08 | 8.77 | 10.01 | 10.79 | 12.62 |
| 9 | Monoglyceride citrate (200 ppm) | 5.60 | 11.10 | 8.54 | 10.08 | 9.45 | 9.88 |
| 10 | Monoglyceride citrate | 5.40 | 8.57 | 8.23 | 9.92 | 9.39 | 9.16 |
| 11 | 8-hydroxyquinoline | 0.47 | 0.74 | 0.75 | 0.94 | 1.62 | — |
| 12 | Sodium gluconate | 5.52 | 8.63 | 10.73 | — | — | — |
| 13 | Catechol | 0.09 | 0.46 | 0.46 | 0.48 | 0.66 | 0.85 |
| 14 | ($Na_2$ EDTA) | 0.31 | 0.64 | 0.71 | 0.86 | 0.90 | 0.96 |
| 15 | DTPA | 0.29 | 0.38 | 0.33 | 0.34 | 0.33 | 0.36 |
| 16 | Salycilic acid (SA) (1000 ppm) | 4.12 | 9.08 | 9.52 | 9.41 | 9.68 | 11.07 |
| 17 | SA + EDTA | — | 1.02 | 1.59 | 1.26 | 1.31 | — |
| 18 | SA + DTPA | 0.44 | 0.42 | 0.35 | 0.35 | 0.38 | — |

[a]Moisture 72.4% and fat 10.5%
[b]Addition level of phosphates, 3000 ppm, any other chelators, 500 ppm, unless otherwise specified effectively limited the development of fat oxidation, and the TBA numbers did not exceed unity over a 5-week storage period. The effectiveness of sodium tripolyphosphate was limited to the first two weeks of storage and sodium phosphates and sodium hexametaphosphate moval of plutonium or cadmium, and the effects of EDTA and DTPA were minor, using mixed-ligands of EDTA-SA and DTPA-SA. J. Schubert and S. K. Derr (Nature, 275, 311, 1978) successfully removed plutonium and cadmium from mice. It has been documented that while SA forms a strong iron-salycilate complex, EDTA reacts with cadmium to give Cd-EDTA complex. Therefore, mixed ligands of this nature are not unprecedented. Based on this favourable information, we monitored TBA numbers of meats treated with these mixed ligands over a 5-week storage period. However, results in Table 4 do not indicate any synergistic effect due to application of these reagents in combinations.

EXAMPLE 5

Effect of Antimicrobial Agents

The TBA numbers of meats treated with sodium hypophosphite, potassium sorbate and propyl paraben ® are given in Table 5. Results indicate a slight decrease in the TBA numbers of meats treated with these chemicals. While antimicrobial properties of these reagents are well documented, no studies are available in the literature on their effect on fat oxidation which we could use as a basis for comparison with our work.

EXAMPLE 6

Effect of Dinitrosyl Ferrohemochrome Pigment

The oxidative stability of meats cured with different addition levels of the preformed cooked cured-meat pigment, expressed in TBA numbers, is shown in Table 6. Results demonstrate definite antioxidative properties for the pigment. These effects become more pronounced with increasing addition levels. The antioxidant activity of the pigment at levels of 18–24 ppm is similar to that of 25 ppm sodium nitrite.

Although the pro-oxidative effect of hemoprotein muscle pigments and nonheme iron have been known for many years, the role of heme compounds as antioxidants has been recognized only more recently. In particular, the antioxidant properties of nitric-oxide myoglobin have been well documented. The iron atom in dinitrosyl ferrohemochrome, like in nitric-oxide myoglobin, has all its coordination sites occupied, and this may explain the fact that both compounds show antioxidant properties.

TABLE 5

| | Effect of Antimicrobial Agents on the TBA Numbers of Meat[a] | | | | | | |
|---|---|---|---|---|---|---|---|
| | | Days of Storage at 4° C. | | | | | |
| No. | Meat System[b] | 1 | 7 | 14 | 21 | 28 | 35 |
| 1 | No additive | 4.77 | 6.85 | 8.54 | 11.79 | 11.80 | 13.89 |
| 2 | Sodium hypophosphite | 5.54 | 9.54 | 9.92 | 11.47 | 12.43 | 12.08 |
| 3 | Potassium sorbate | 7.21 | 9.79 | 10.61 | 9.04 | 9.49 | 10.07 |
| 4 | Propyl paraben ® | 4.11 | 10.40 | 10.44 | 11.43 | 12.15 | 12.48 |

[a]Moisture 69.93%, and fat 10.6%
[b]Potassium sorbate, 2600 ppm; and SHP and propyl paraben ® , 3000 ppm

TABLE 6

| | Effect of Dinitrosyl Ferrohemochrome on the TBA Numbers of Meat[a] | | | | | | |
|---|---|---|---|---|---|---|---|
| | | Days of Storage at 4° C. | | | | | |
| No. | Meat System | 1 | 7 | 14 | 21 | 28 | 35 |
| 1 | No additive | 4.39 | 11.49 | 11.00 | 13.28 | 13.76 | 15.46 |
| 2 | Pigment (3 ppm) | 0.72 | 8.58 | 7.38 | 9.94 | 11.01 | 10.86 |
| 3 | Pigment (12 ppm) | 0.39 | 8.10 | 7.32 | 9.64 | 9.08 | 9.89 |
| 4 | Pigment (18 ppm) | 0.18 | 6.74 | 7.01 | 7.18 | 7.42 | 7.76 |
| 5 | Pigment (24 ppm) | 0.09 | 4.98 | 4.26 | 5.70 | 5.06 | 7.14 |

[a]Moisture 70.05%; fat 10.67%; protein 18.69%; ash 0.81%

EXAMPLE 7

Effect of Combinations of Antioxidants, Chelators, Pigment and Antimicrobial Agents Table 7 summarizes the TBA values of meat systems containing salt, sugar, antioxidants or chelators, sodium nitrite and dinitrosyl ferrohemochrome, with or without antimicrobial agents.

Although sodium ascorbate showed antioxidant properties (Table 2), in the presence of salt and sugar, this effect is observed only during the first 3 weeks of storage. Addition of our pigment to this mixture resulted in further reduction of TBA numbers as expected from the antioxidative nature of this pigment. Replacement of sodium ascorbate with its fat-soluble analogues, ascorbyl palmitate and ascorbyl acetal, greatly reduced the TBA numbers during a 5-week period of storage (<0.5).

Addition of sodium tripolyphosphate (STPP) to meats containing salt, sugar and ascorbate also greatly reduced the TBA numbers, showing significant synergism with sodium ascorbate in the system.

The effect of our pigment on the TBA numbers of systems containing salt, sugar, ascorbate and STPP was significant as a 3-fold reduction in the TBA values was observed after 5 weeks of storage. Furthermore, this decrease was similar to that of the same system treated with 150 ppm sodium nitrite. Addition of sodium hypophosphite (SHP) or potassium sorbate as antimicrobial agents to the system containing dinitrosyl ferrohemochrome and other pickle ingredients did not affect the TBA results to any appreciable extent. A decrease in the addition level of both STPP and SHP from 3000 to 1500 ppm resulted in a limited increase in TBA numbers to a value of 0.51 after 5 weeks of storage.

While sodium hexametaphosphate (SHMP) alone played a minimal antioxidative role in meats (see Table 4), in the system containing salt, sugar, sodium ascorbate and our pigment, it significantly reduced the TBA numbers to a value of only 0.31 which is very similar to that of STPP. Such strong synergistic actions were not observed for monosodium phosphate, and even weaker effects were noted for disodium phosphate.

Replacement of STPP with Na$_2$ EDTA, DTPA or catechol was equally successful as the TBA data indicate (see Table 7). When citric acid replaced STPP, synergistic effects were only effective in reducing fat

TABLE 7

| | Effect of Pickle Ingredients on the TBA Numbers of Meat[a] | | | | | | |
|---|---|---|---|---|---|---|---|
| | | Days of Storage at 4° C. | | | | | |
| No. | Meat System | 1 | 7 | 14 | 21 | 28 | 35 |
| 1 | No additive | 4.95 | 8.96 | 10.50 | 11.67 | 12.12 | 13.73 |
| 2 | Salt + Sugar + Na ascorbate (ASc) | 1.35 | 7.74 | 8.46 | 9.64 | — | 15.93 |
| 3 | (2) + Pigment | 0.59 | 6.81 | 8.66 | — | — | — |
| 4 | (3), but with ascorbyl acetal or ASc | 0.30 | 0.31 | 0.35 | 0.40 | 0.52 | 0.32 |

TABLE 7-continued
Effect of Pickle Ingredients on the TBA Numbers of Meat[a]

| No. | Meat System | Days of Storage at 4° C. | | | | | |
|-----|-------------|---|---|---|---|---|---|
| | | 1 | 7 | 14 | 21 | 28 | 35 |
| 5 | (3), but with ascorbyl palmitate for ASc | 0.25 | 0.36 | 0.47 | 0.40 | 0.38 | 0.43 |
| 6 | (2) + Na tripolyphosphate (STPP) | 0.58 | 0.53 | 0.51 | 0.66 | 0.86 | 1.32 |
| 7 | (6) + Na nitrite (150 ppm) | 0.22 | 0.28 | 0.20 | 0.20 | 0.34 | 0.43 |
| 8 | (6) + Pigment | 0.24 | 0.35 | 0.34 | 0.37 | 0.37 | 0.45 |
| 9 | (8) + Na hypophosphite (SHP) | 0.27 | 0.34 | 0.36 | 0.33 | — | 0.30 |
| 10 | (9), but with 1500 ppm of STPP and SHP | 0.30 | 0.35 | 0.37 | 0.39 | — | 0.51 |
| 11 | (8) + K sorbate | 0.64 | 0.53 | 0.74 | 0.46 | — | 0.47 |
| 12 | (8) + Na nitrite (25 ppm) | 0.21 | 0.16 | 0.26 | 0.55 | 0.26 | 0.65 |
| 13 | (8) + Na nitrite (50 ppm) | 0.20 | 0.17 | 0.14 | 0.21 | 0.22 | 0.35 |
| 14 | (8), but with Na hexametaphosphate (SHMP) for STPP | 0.38 | 0.27 | 0.33 | 0.49 | 0.35 | 0.31 |
| 15 | (8), but with NaH$_2$PO$_4$ for STPP | 0.55 | 1.31 | 1.86 | 1.56 | 1.62 | 1.78 |
| 16 | (8), but with Na$_2$HPO$_4$ for STPP | 0.89 | 3.45 | 3.20 | 3.00 | 4.39 | 5.64 |
| 17 | (8), but with ascorbyl acetal for ASc | 0.27 | 0.26 | 0.22 | 0.25 | 0.26 | 0.27 |
| 18 | (8), but with ascorbyl palmitate for ASc | 0.15 | 0.22 | 0.23 | 0.27 | 0.38 | 0.22 |
| 19 | (8), but with Na$_2$ EDTA for STPP | 0.40 | 0.76 | 0.36 | 0.78 | 0.57 | — |
| 20 | (8), but with DTPA for STPP | 0.71 | 0.31 | — | 0.53 | 0.43 | — |
| 21 | (8), but with CA for STPP | 0.17 | 0.76 | 0.60 | 0.81 | 1.24 | — |
| 22 | (8), but with catechol for STPP | 0.57 | 0.29 | 0.22 | 0.33 | 0.44 | — |
| 23 | (8), but with SA for STPP | 0.17 | 2.50 | 4.45 | 5.71 | 10.67 | 12.23 |
| 24 | (8) + BHA | 0.29 | 0.22 | 0.23 | 0.27 | 0.38 | 0.22 |
| 25 | (8) + BHT | 0.22 | 0.20 | 0.19 | 0.31 | 0.28 | 0.56 |
| 26 | (8) + PG | 0.22 | 0.16 | 0.21 | 0.37 | 0.23 | 0.39 |

[a]Moisture 69.93%; fat 10.6% oxidation during the first 3 weeks of storage and after that, TBA numbers exceeded 1.

It is interesting to note that the addition of BHA, BHT and PG, as well as sodium nitrite (25 and 50 ppm) to the systems containing salt, sugar, ascorbate, STPP and the pigment had minimal further effects on the TBA numbers.

We claim:

1. A composition for curing meat comprising dinitrosyl ferrohemochrome, at least one antioxidant agent, at least one sequestering agent and at least one antimicrobial agent.

2. The composition of claim 1 wherein the antioxidant is selected from the group consisting of dl-α-tocopherol, butylated hydroxyanisole, butylated hydroxytoluene, propyl gallate, trihydroxybutyrophenone, nordihydroguaiaretic acid, t-butylhydroquinone, catechol, gum guaiac, lecithin, dilauryl thiodipropionate, ascorbic acid, physiologically acceptable salts of ascorbic acid, erythorbic acid, ascorbyl palmitate and ascorbyl acetal.

3. The composition of claim 1 wherein the sequestering agent is selected from the group consisting of monosodium phosphate, disodium phosphate, sodium hexametaphosphate, sodium tripolyphosphate, sodium pyrophosphate, citric acid, monoglyceride citrate, 8-hydroxyquinoline, sodium gluconate, catechol, ethylenediamine tetraacetic acid, disodium ethylenediamine tetraacetate, diethylenetriamine pentaacetic acid and salicylic acid.

4. The composition of claim 1 wherein the antimicrobial agent is selected from the group consisting of sodium hypophosphite, potassium sorbate, propyl parahydroxybenzoate, methyl fumarate, dimethyl fumarate, ethyl fumarate, and diethyl fumarate.

5. The composition of claim 1 wherein the antioxidant agent is selected from the group consisting of sodium ascorbate, ascorbyl acetal, ascorbyl palmitate, t-butylhydroquinone, butylated hydroxyanisole and trihydroxybutyrophenone; and the sequestering agent is selected from the group consisting of sodium tripolyphosphate, sodium hexametaphosphate, ethylenediamine tetraacetic acid and diethylenetriamine pentaacetic acid.

6. The composition of claim 1 comprising:
(a) dinitrosyl ferrohemochrome,
(b) an antioxidant,
(c) a sequestering agent, and
(d) an antimicrobial agent, wherein the weight to weight ratios are: (b)/(a) below 64; (c)/(a) below 160 for a non-phosphate sequestering agent and below 1000 for a phosphate sequestering agent; and (d)/(a) below 1000.

7. The composition of claim 6 wherein the weight to weight ratios are: (b)/(a) about 16, (c)/(a) about 40 for a non-phosphate sequestering agent and about 240 for a phosphate sequestering agent, and (d)/(a) about 240.

8. A kit comprising the components of the composition of claim 6 in separately packaged units.

9. A mixture of the composition of claim 1 with water.

10. A mixture of the composition of claim 1 with either salt or salt and sugar.

11. A mixture of the composition of claim 10 and water.

12. A process of application of the composition of claim 1 to meat and meat products comprising dissolving the water-soluble ingredients in said composition in water together with salt and sugar, applying water-insoluble ingredients in said composition to meat and combining the modified meat and the water-based solution.

13. The process of claim 12 wherein the proportion of components, measured per unit wet weight of meat and meat additives, is about 2% salt, about 1.5% sugar, 6 to 24 ppm of dinitrosyl ferrohemochrome, below 400 ppm of antioxidant, below 1000 ppm of a non-phosphate sequestering agent or below 6000 ppm of a phosphate sequestering agent, and below 6000 ppm of an antimicrobial agent.

14. The process of claim 13 wherein the proportion of components, measured per unit wet weight of meat and meat additives, is about 2% salt, about 1.5% sugar, about 12 ppm of dinitrosyl ferrohemochrome, about 200 ppm of antioxidant, and about 500 ppm of non-phosphate sequestering agent.

15. The process of claim 13 wherein the proportion of components, measured per unit wet weight of meat and meat additives, is about 2% salt, about 1.5% sugar, about 12 ppm of dinitrosyl ferrohemochrome, about 200 ppm of antioxidant, and about 3000 ppm of phosphate containing sequestering agent.

16. An essentially nitrite-free meat product containing the composition of claim 1.

* * * * *